(12) United States Patent
Motsch et al.

(10) Patent No.: US 8,240,964 B2
(45) Date of Patent: Aug. 14, 2012

(54) SHEET METAL NUT

(75) Inventors: Uwe Motsch, Rheinfelden (DE); Klaus Hullmann, Lörrach (DE)

(73) Assignee: A. Raymond et Cie, Grenoble (FR)

( * ) Notice: Subject to any disclaimer, the term of this patent is extended or adjusted under 35 U.S.C. 154(b) by 678 days.

(21) Appl. No.: 12/094,709

(22) PCT Filed: Nov. 16, 2006

(86) PCT No.: PCT/EP2006/010993
§ 371 (c)(1),
(2), (4) Date: May 22, 2008

(87) PCT Pub. No.: WO2007/073804
PCT Pub. Date: Jul. 5, 2007

(65) Prior Publication Data
US 2008/0260490 A1 Oct. 23, 2008

(30) Foreign Application Priority Data
Dec. 16, 2005 (DE) .......................... 10 2005 060 137

(51) Int. Cl.
*F16B 37/04* (2006.01)
(52) U.S. Cl. ........ 411/182; 411/112; 411/173; 411/183; 411/508; 411/970
(58) Field of Classification Search .................. 411/103, 411/183, 106, 172–179, 522–527, 111–113, 411/182, 508, 913, 970; 24/289, 293, 297
See application file for complete search history.

(56) References Cited

U.S. PATENT DOCUMENTS

| 2,252,932 | A | * | 8/1941  | Johnson ........................ 411/427 |
| 2,390,752 | A |   | 1/1944  | Tinnerman |
| 2,946,612 | A | * | 7/1960  | Ahlgren .......................... 292/17 |
| 3,362,278 | A | * | 1/1968  | Munse ........................... 411/437 |
| 3,375,749 | A | * | 4/1968  | Coldren et al. ................. 411/15 |
| 3,426,817 | A | * | 2/1969  | Andrews et al. .............. 411/173 |
| 4,281,699 | A | * | 8/1981  | Grube ........................... 411/176 |
| 4,300,865 | A | * | 11/1981 | Murray ........................... 411/15 |
| 4,708,556 | A | * | 11/1987 | Pamer et al. ................. 411/179 |
| 4,732,518 | A | * | 3/1988  | Toosky ......................... 411/181 |

(Continued)

FOREIGN PATENT DOCUMENTS
DE  1923321 A  11/1969
(Continued)

Primary Examiner — Victor Batson
Assistant Examiner — Roberta Delisle
(74) Attorney, Agent, or Firm — Faegre Baker Daniels

(57) ABSTRACT

A sheet metal nut including a cage part (1) that is fitted with a bottom plate (2), supporting edge sections, and opposite side plates (4, 5). Contacting final sections (15, 16) are disposed across from the supporting edge sections and grip the peripheral zones of a hole along with the supporting edge sections in a mounted arrangement of the sheet metal nut. The supporting edge sections are molded onto the bottom plate (2) while a separate securing part (10) is joined to the side plates (4, 5) and is equipped with two leg plates (11, 12) that are located between the side plates (4, 5) and extend from a base region (13) towards the supporting edge sections (24, 25) at an increasing distance from each other. The contacting final sections (15, 16) are molded onto one respective free end of a leg plate (11, 12), are aligned with their front sides directed towards one another, and lie across from the supporting edge sections (24, 25).

20 Claims, 2 Drawing Sheets

U.S. PATENT DOCUMENTS

| | | | |
|---|---|---|---|
| 5,536,125 A * | 7/1996 | Gaw, Jr. | 411/182 |
| 5,564,873 A * | 10/1996 | Ladouceur et al. | 411/180 |
| 5,807,050 A * | 9/1998 | Daler et al. | 411/36 |
| 5,927,920 A * | 7/1999 | Swanstrom | 411/180 |
| 6,438,804 B1 * | 8/2002 | Romero Magarino | 24/289 |
| 6,637,994 B2 * | 10/2003 | Leistner | 411/181 |
| 6,692,206 B1 * | 2/2004 | Clinch et al. | 411/171 |
| 6,840,727 B1 * | 1/2005 | Vassiliou | 411/173 |
| 6,976,292 B2 * | 12/2005 | MacPherson et al. | 24/293 |
| 7,226,260 B2 * | 6/2007 | Jackson et al. | 411/173 |
| 7,568,868 B2 * | 8/2009 | Motsch et al. | 411/112 |
| 2005/0271492 A1 | 12/2005 | Jackson, Jr. et al. | |
| 2009/0169326 A1 * | 7/2009 | Hullmann et al. | 411/103 |

FOREIGN PATENT DOCUMENTS

| | | |
|---|---|---|
| DE | 20319556 U1 | 3/2004 |
| GB | 1217382 | 12/1970 |

\* cited by examiner

SHEET METAL NUT

CROSS-REFERENCE TO RELATED APPLICATION

This application is a U.S. National Phase Patent Application based on International Application Serial No. PCT/EP2006/010993 filed Nov. 16, 2006, the disclosure of which is hereby explicitly incorporated by reference herein.

BACKGROUND OF THE INVENTION

1. Field of the Invention

The invention relates to a sheet metal nut.

2. Description of the Related Art

One sheet metal nut is known from US 2005/0271492 A1. The known sheet metal nut, intended for mounting in a hole in a support part, comprises a cage part, which can be inserted in the hole and can be brought in engagement with a connecting part for joining an attachment part with the support part. The cage part has a bottom plate, supporting edge sections which come in contact with peripheral zones of the hole, and side plates located opposite one another, and is formed with the contacting final sections arranged opposite the supporting edge sections; in the mounted arrangement of the sheet metal nut, the supporting edge sections grip the peripheral zones of the hole. The supporting edge sections are integrally molded on the bottom plate. Furthermore, two leg plates are present, lying opposite one another, which, in the known sheet metal nut are formed on the cage part and arranged between the side plates and extend from a base region in the direction of the supporting edge sections at an increasing distance from each other. The contacting final sections are each integrally molded on a free end of a leg plate facing the supporting edge sections; their fronts face one another and the flat sides of the supporting edge sections lie opposite one another.

Another sheet metal nut is known from DE-A-19 23 321. The sheet metal nut is formed in one piece and punched from a metal sheet. It comprises a cage part which has supporting edge sections that come into contact with peripheral zones of a hole integrated in a support part in which the sheet metal nut is to be mounted.

Side plates of the cage part located opposite one another can be inserted in the hole in the support part, flexible contacting final sections furthermore being arranged opposite the supporting edge sections and, in the mounted arrangement, gripping the peripheral zones of the hole. A connecting part, which can be brought into engagement with the sheet metal nut, is provided to join an attachment part to the supporting part.

SUMMARY OF THE INVENTION

The present invention provides a sheet metal nut characterized by high pull-out forces.

Due to the embodiment of the sheet metal nut according to the invention, with a cage part and a separate securing part, the contacting final sections, now formed on the leg plates provided on the separate securing part, lie in large-surface contact with flat sides on the peripheral zones of the hole located opposite the supporting edge sections, while the leg plates in the base region are joined with one another and secured against bending by the center tie, so that especially high pull-out forces, possibly even deforming the support part, are required before the sheet metal nut according to the invention can be pulled out of the hole.

In one form thereof, the present invention provides a sheet metal nut for mounting in a hole of a support part with a cage part, which can be inserted in the hole and brought in engagement with a connecting part to join an attachment part to the support part, the cage part having a bottom plate, supporting edge sections, which come in contact with edge areas of the hole, and side plates located opposite one another, and with the contacting final sections arranged opposite the supporting edge sections, which, in the mounted arrangement of the sheet metal nut, grip the peripheral zones of the hole, the supporting edge sections being integrally molded to the bottom plate and being equipped with two leg plates located opposite one another, which are arranged between the side plates and extend from a base region facing away from the contacting final sections at an increasing distance from each other, towards the supporting edge sections, and the contacting final sections being molded onto one respective free end of a leg plate face one another by means of the fronts thereof, and lie across from the supporting edge sections by means of the flat sides of the supporting edge sections, characterized in that a separate securing part is provided, which is joined to the side plates formed on the cage part and which has the leg plates, and that the leg plates are joined with one another in the base region by means of a center tie.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
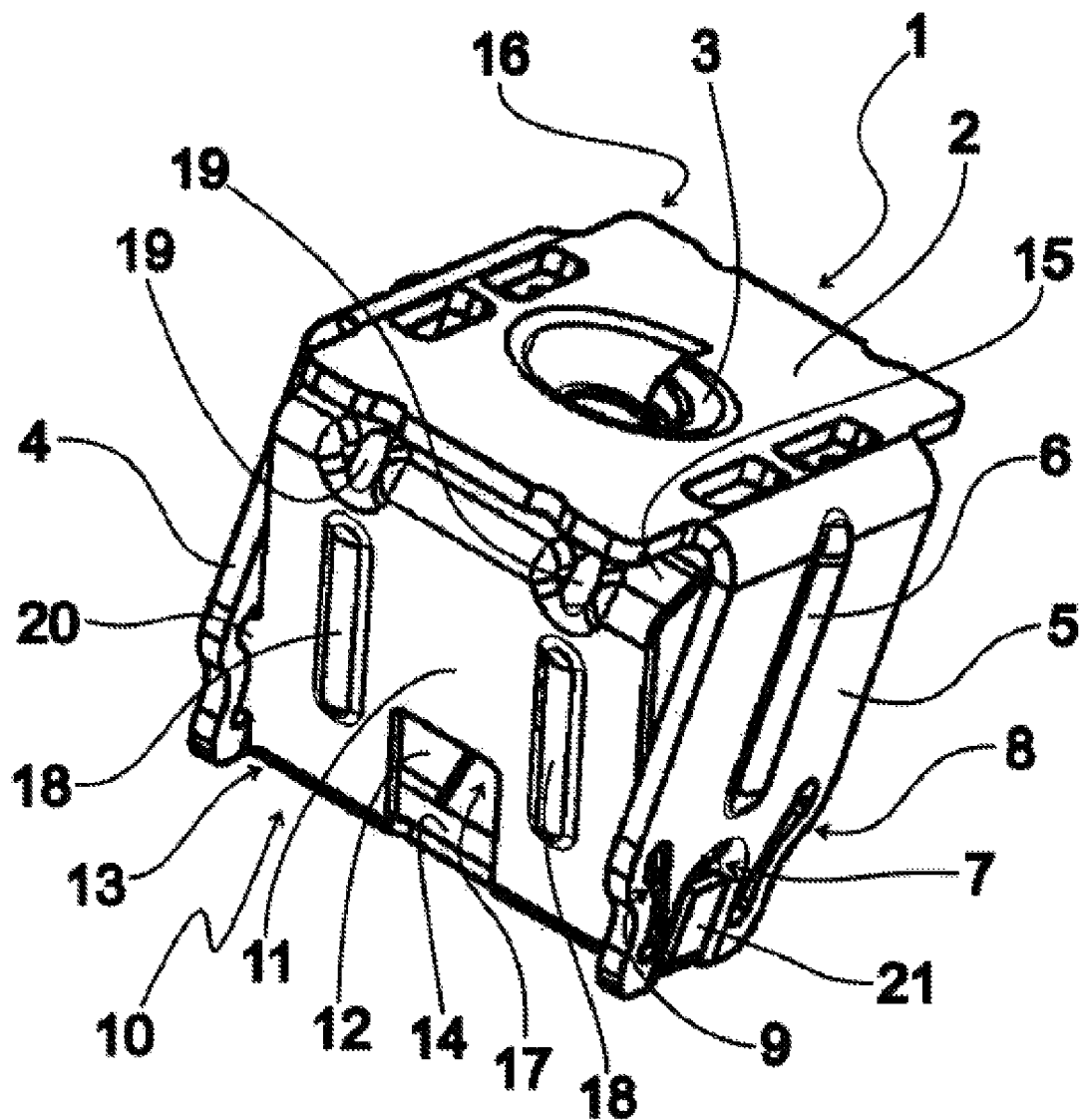
FIG. 1 is a perspective view of an exemplary embodiment of a sheet metal nut according to the invention.

Corresponding reference characters indicate corresponding parts throughout the several views. Although the exemplifications set out herein illustrate an embodiment of the invention, the embodiment disclosed below is not intended to be exhaustive or to be construed as limiting the scope of the invention to the precise form disclosed.

DETAILED DESCRIPTION

FIG. 1 shows a perspective view of an exemplary embodiment of a sheet metal nut according to the invention. The exemplary embodiment according to FIG. 1 has a cage part 1, which is formed with a flat, here essentially square bottom plate 2. In approximately the center of the bottom plate 2, thread tabs 3 of an embossing thread are formed as a relatively cost-effectively producible embodiment of a thread structure in which a connecting part not shown in FIG. 1 can be screwed in the form of a sheet metal screw. An undepicted embodiment of a thread structure is, for example, a threaded collar with screwing conveyed to an internal thread, possibly executed with a screw locking device.

On two opposite edge sides of the bottom plate 2, two side plates 4, 5 that are essentially bent 90 degrees in one direction are integrally molded, formed in the longitudinal direction. Side plates 4, 5 each include an elongated bracing bead 6. On their free ends located opposite the bottom plate 2, the side plates 4, 5 each have a center opening 7 and two edge openings 8, 9 arranged on both sides of the center opening 7. The center opening 7 is open in the direction of the side facing away from the bottom plate 2, while the edge openings 8, 9 are closed.

The sheet metal nut according to the invention furthermore has a separate securing part 10, which has two leg plates 11, 12 located opposite one another. The leg plates 11, 12 are connected to one another by a center tie 14 in a base region 13 of the securing part 10 and extend away from the base region 13 at an increasing distance from one another. Flexible contacting final sections 15, 16 are integrally molded on the ends of the leg plates 11, 12 facing away from the base region 13 and are aligned with their front sides directed towards one another.

The leg plates 11, 12 each exhibit an approximately centrally arranged base opening 17 in the base region 13 and, as bracing, two elongated bracing beads 18 extending longitudinally between the base opening 17 and an edge side. Dome-like bracing beads 19 are arranged in the transition area between the leg plates 11, 12 and the contacting final sections 15, 16, extending from the elongated bracing beads 18 to increase the bending resistance in this area.

Furthermore, it can be seen from the illustration according to FIG. 1 that the securing part 10 has securing ties 20 projecting outward, integrally molded to the leg plates 11, 12 in the base region 13, which engage with the edge openings 8, 9 integrated in the side plates 4, 5 of the cage part 1.

Furthermore, the securing part 10 is designed with edge tongues 21, which extend from the center tie 14 in the direction of the contacting final sections 15, 16 and are each arranged in a center opening 7 integrated in the side plates 4, 5 of the cage part 1. In this way, the securing part 10 is held in the cage part 1 with a certain low mobility.

Figure 2:
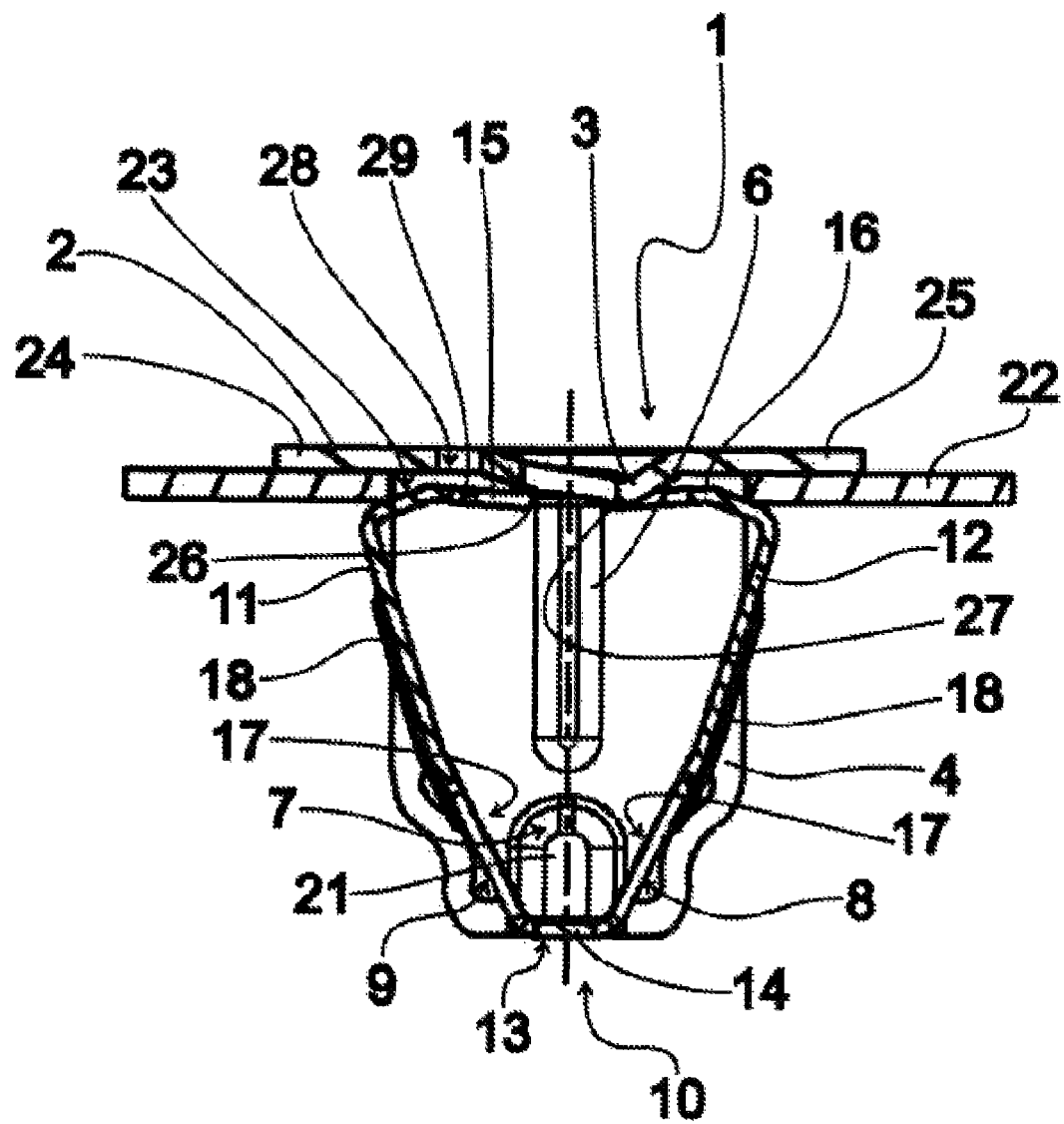
FIG. 2 is a cross-section of the exemplary embodiment according to FIG. 1 in a mounted situation.

FIG. 2 shows a cross section of the exemplary embodiment according to FIG. 1 with a view of the side plate 4, shown in the depiction according to FIG. 2 facing towards the rear in a mounted situation, in which the sheet metal nut according to the invention is inserted in a hole 23 integrated in a support part 22. It can be seen from FIG. 2 that in the mounted situation, the cage part 1, with side supporting edge sections 24, 25 integrally molded to the bottom plate 2, which are located between the side plates 4, 5 and extend outwards, lie on one side of the hole 23 in peripheral zones, while the contacting final sections 15, 16 of the securing part 10 with their flat sides arranged opposite the supporting edge sections 24, 25, with which the peripheral zones of the hole 23 lying opposite the supporting edge sections 24, 25 are in contact.

In this way, a relatively large supporting area is obtained both for the contacting final sections 15, 16 and the supporting edge sections 24, 25 on the peripheral zones of the hole 23, which leads to very high pull-out forces.

The contacting final sections 15, 16 are preferably placed at an angle to the supporting edge sections 24, 25 in order, for example, to compensate for thickness tolerances of the support part 22 or to achieve a certain contact pressure. Furthermore, as shown in FIG. 2, the contacting final sections 15, 16 extend so far towards one another that the gap between their front sides 26, 27 corresponds roughly to the effective diameter of the embossing thread. In this way it is ensured that any deflection of the leg plates 11, 12 is blocked after the fastening element engages with the embossing thread and the high pull-out forces remain even if the sheet metal nut is tilted.

Furthermore, it can be seen from FIG. 2 that the bottom plate 2 is formed with continuous dismantling openings 28, while the contacting final sections 15, 16 exhibit engagement openings 29, which are arranged opposite the dismantling openings 28. In this way, with a dismantling tool not shown in FIG. 2, which engages through the dismantling openings 28 in the bottom plate 2 and comes into engagement with the engagement openings 29 of the contacting final sections 15, 16, the leg plates 11, 12 can be pressed together such that the sheet metal nut can again be removed easily and simply from the support part 22 despite the otherwise high pull-out forces.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A sheet metal nut for mounting in a hole of a support part to receive a connecting part to join an attachment part, said sheet metal nut comprising:
   a cage part, comprising:
      a bottom plate with supporting edge sections integral with said bottom plate and engageable with edge areas of the hole; and
      a pair of side plates extending from said bottom plate and located opposite one another, said side plates each including at least one edge opening disposed distally from said bottom plate, said edge openings are formed as closed slots within said side plates;
   a securing part separate from said cage part, comprising:
      a pair of leg plates located opposite one another, said leg plates disposed between said side plates and extending from one another in a diverging manner from a center tie section, said leg plates terminating in free ends having integrally formed contacting final sections facing one another and disposed proximal to said supporting edge sections, said leg plates each including at least one securing tie projecting laterally therefrom, said securing ties disposed perpendicular to said side plates and received within respective said edge openings of said side plates.

2. The sheet metal nut of claim 1, wherein each said side plate includes a pair of said edge openings disposed on respective opposite sides of said side plate, and each said leg plate includes a pair of said securing ties projecting from respective opposite lateral sides of said leg plate, said securing ties received within respective said edge openings of said side plates.

3. The sheet metal nut of claim 1, wherein said contacting final sections are aligned at an angle in relation to said supporting edge sections.

4. The sheet metal nut of claim 1, wherein said bottom plate and said contacting final sections include openings located opposite one another, said openings adapted to receive a dismantling tool.

5. The sheet metal nut of claim 1, further comprising bracing beads integrally formed in a transition area between said leg plates and said contacting final sections.

6. The sheet metal nut of claim 1, further comprising elongated bracing beads extending in a longitudinal direction and integrally formed in at least one of said side plates and said leg plates.

7. A sheet metal nut for mounting in a hole of a support part to receive a connecting part to join an attachment part, said sheet metal nut comprising:
   a cage part, comprising:
      a bottom plate with supporting edge sections integral with said bottom plate and engageable with edge areas of the hole, said bottom plate including a thread structure formed in said bottom plate; and a pair of side plates extending from said bottom plate and located opposite one another, said side plates each including at least one edge opening disposed distally from said bottom plate;

a securing part separate from said cage part, comprising:
a pair of leg plates located opposite one another, said leg plates disposed between said side plates and extending from one another in a diverging manner from a center tie section, said leg plates terminating in free ends having integrally formed contacting final sections facing one another and disposed proximal to said supporting edge sections, said leg plates each including at least one securing tie projecting laterally therefrom, said securing ties disposed perpendicular to said side plates and received within respective said edge openings of said side plates.

8. The sheet metal nut of claim 7, wherein said contacting final sections include front sides disposed at a distance from one another that substantially corresponds to an effective diameter of said thread structure.

9. The sheet metal nut of claim 7, wherein said contacting final sections are aligned at an angle in relation to said supporting edge sections.

10. The sheet metal nut of claim 7, wherein said bottom plate and said contacting final sections include openings located opposite one another, said openings adapted to receive a dismantling tool.

11. The sheet metal nut of claim 7, further comprising bracing beads integrally formed in a transition area between said leg plates and said contacting final sections.

12. The sheet metal nut of claim 7, further comprising elongated bracing beads extending in a longitudinal direction and integrally formed in at least one of said side plates and said leg plates.

13. A sheet metal nut for mounting in a hole of a support part to receive a connecting part to join an attachment part, said sheet metal nut comprising:
a cage part, comprising:
a bottom plate with supporting edge sections integral with said bottom plate and engageable with edge areas of the hole; and a pair of side plates extending from said bottom plate and located opposite one another, said side plates each including a center opening disposed distally from said bottom plate;

a securing part separate from said cage part, comprising:
a pair of leg plates located opposite one another, said leg plates disposed between said side plates and extending from one another in a diverging manner from a center tie section, said leg plates terminating in free ends having integrally formed contacting final sections facing one another and disposed proximal to said supporting edge sections; and a pair of edge tongues projecting from opposite lateral sides of said center tie section, said edge tongues disposed parallel to said side plates and respectively received within said center openings of said side plates.

14. The sheet metal nut of claim 13, wherein said center openings are open to distal edges of said side plates.

15. The sheet metal nut of claim 13, wherein said contacting final sections are aligned at an angle in relation to said supporting edge sections.

16. The sheet metal nut of claim 13, wherein said bottom plate and said contacting final sections include openings located opposite one another, said openings adapted to receive a dismantling tool.

17. The sheet metal nut of claim 13, wherein a thread structure is formed in said bottom plate.

18. The sheet metal nut of claim 17, wherein said contacting final sections include front sides disposed at a distance from one another that substantially corresponds to an effective diameter of said thread structure.

19. The sheet metal nut of claim 13, further comprising bracing beads integrally formed in a transition area between said leg plates and said contacting final sections.

20. The sheet metal nut of claim 13, further comprising elongated bracing beads extending in a longitudinal direction and integrally formed in at least one of said side plates and said leg plates.

* * * * *